United States Patent [19]
Brittain et al.

[11] Patent Number: 4,819,262
[45] Date of Patent: Apr. 4, 1989

[54] ELECTRONIC GATING CONTROL FOR MANUAL TELEPHONE SWITCHBOARD

[75] Inventors: Donald Brittain, Fairfax, Va.; Germain Boutin, Edina, Minn.

[73] Assignee: Guardian Telecommunications Systems, Inc./VASA Engineering, Fairfax, Va.

[21] Appl. No.: 113,750

[22] Filed: Oct. 28, 1987

[51] Int. Cl.$^4$ ............................................. H04M 5/00
[52] U.S. Cl. ..................................... 379/157; 379/214; 379/321; 379/159
[58] Field of Search ............... 379/214, 156, 157, 158, 379/159, 160, 210, 213, 218, 265, 308, 312, 313, 319, 320, 321, 208, 309

[56] References Cited

U.S. PATENT DOCUMENTS 1,541,926  6/1925  Davidson ............................. 379/214
3,341,663  9/1967  Stefano ................................ 379/214
3,786,198  1/1974  McNulty et al. .................... 379/218
4,574,165  3/1986  Smith et al. ........................ 379/214

Primary Examiner—Jin F. Ng
Assistant Examiner—Wing Fu Chan
Attorney, Agent, or Firm—Kerkam, Stowell, Kondracki & Clarke

[57] ABSTRACT

A gating circuit for operation in conjunction with a manual cord telephone switchboard to service multiple operational modes of a subscriber telephone connected for telephone communication to a central office. In one mode, an internal intercom connection is established between the subscriber telephone and the switchboard. In a second mode a secretarial service connection is established allowing direct communication between the switchboard and the central office. A ring detection circuit detects when the subscriber telephone has been rung from the central office.

10 Claims, 3 Drawing Sheets

ELECTRONIC GATING CONTROL FOR MANUAL TELEPHONE SWITCHBOARD

FIELD OF THE INVENTION

This invention relates to telephone switchboard systems and more particularly to an electronic gating control for a telephone switchboard which allows a single common jack to establish two modes of communication with a remote telephone position or extension.

DESCRIPTION OF THE PRIOR ART

In small apartments and businesses, a switchboard and associated equipment, usually located on the premises, are utilized to provide for switching calls between any two stations or telephones served by the switchboard or between any telephone and the nationwide telephone system via a trunk to a central office. Switching functions at the switchboard are performed manually by an attendant who plugs cords into selected jacks associated with an exchange, a central office trunk and tie trunk. With a cord-type manual switchboard utilizing jacks, each jack has an associated lamp and designation for each station, central office trunk and tie trunk. Telephone circuits are terminated in pairs of flexible cords tipped with plugs used to connect to the jacks to establish the desired connections. The attendant has a telephone talk and dial circuits, which can be connected to any cord circuit by operation of appropriate keys or switches.

Frequently, such systems include one or more special service features in addition to normal interconnection and switching of calls. For example, in an apartment building, each extension may be provided with an intercom service and a secretarial service which enables the attendant to communicate directly with a subscriber at an extension (intercom) or take messages for a subscriber at his election (secretarial).

In known systems, to facilitate these services, it is generally required to allocate a separate plug for each service for each extension. Even for a hotel or apartment building of modest size, such a requirement is undesirable from the standpoint of the large physical demands placed on the switchboard and the attendant costs resulting from use of extra components, wiring and space accommodations.

It is, therefore, a principal object of the present invention to provide a switchboard system plug of reduced size and which is highly efficient and economical in operation.

Another object of the present invention is to allow a single jack or station position on the switchboard to service two special operational mode requirements, in house intercom and central office line monitoring and answering.

A further object of the present invention is to reduce the jack requirements for existing manual telephone switchboards which provide secretarial answering service by a factor of two.

SUMMARY OF THE INVENTION

These and other objects of the present invention are accomplished by the present invention which provides an electronic gating circuit mounted on a printed circuit board (PCB) and designed to operate in conjunction with any manual cord switchboard. The function of this circuit is to allow a single station or jack position on the switchboard to service two operational mode requirements (in house intercom and Central Office, (C.O.) Line monitoring and answering) for an existing switchboard service. Each PCB contains the required gating circuits to service twenty (20) fully functional positions and eliminates one half of the normal jack requirements of the switchboard for these services. This substantially reduces the size of the switchboard needed, as well as the amount of associated wiring.

In the intercom (in house) mode of operation, the intercom path is channeled through the gating circuit with no monitoring or switching of the call in any fashion. A control switch is provided on the subscriber telephone unit to allow the subscriber to choose Secretarial Answering service. In this mode, any Central Office (C.O.) call coming to the Apartment is routed to the switchboard. With the control switch in the secretarial position, removal of the receiver from its cradle, the OFF hook position, connects the telephone in the Intercom mode and a light and buzzer at the switchboard are energized to alert the attendant.

The gating circuits contained on the PCB continually monitor the apartment C.O. pairs for ringing current when the control switch is in the secretarial position. When ringing current is detected the gating circuit in turn signals the corresponding apartment appearance on the switchboard. This signaling is accomplished by flashing the apartment appearance lamp in the same cadence as the C.O. ringing current is received. The attendant plugs into the associated jack so that the switchboard talk path is then switched to the C.O. path allowing the attendant to answer and converse on the C.O. line. Upon disconnect (unplugging cord), the gating circuit returns to the intercom mode of operation.

The circuit is designed such that it is not possible for the attendant to complete a C.O. line call on an apartment line because, until the ringing current is detected the gating circuit remains in the intercom mode of operation, allowing no access to the apartment C.O. Line. This operation is not under the control of the attendant and prevents defrauding of a subscriber through unauthorized use of the subscriber's telephone.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views.

DESCRIPTION OF THE PREFERRED EMBODIMENTS

Figure 1:
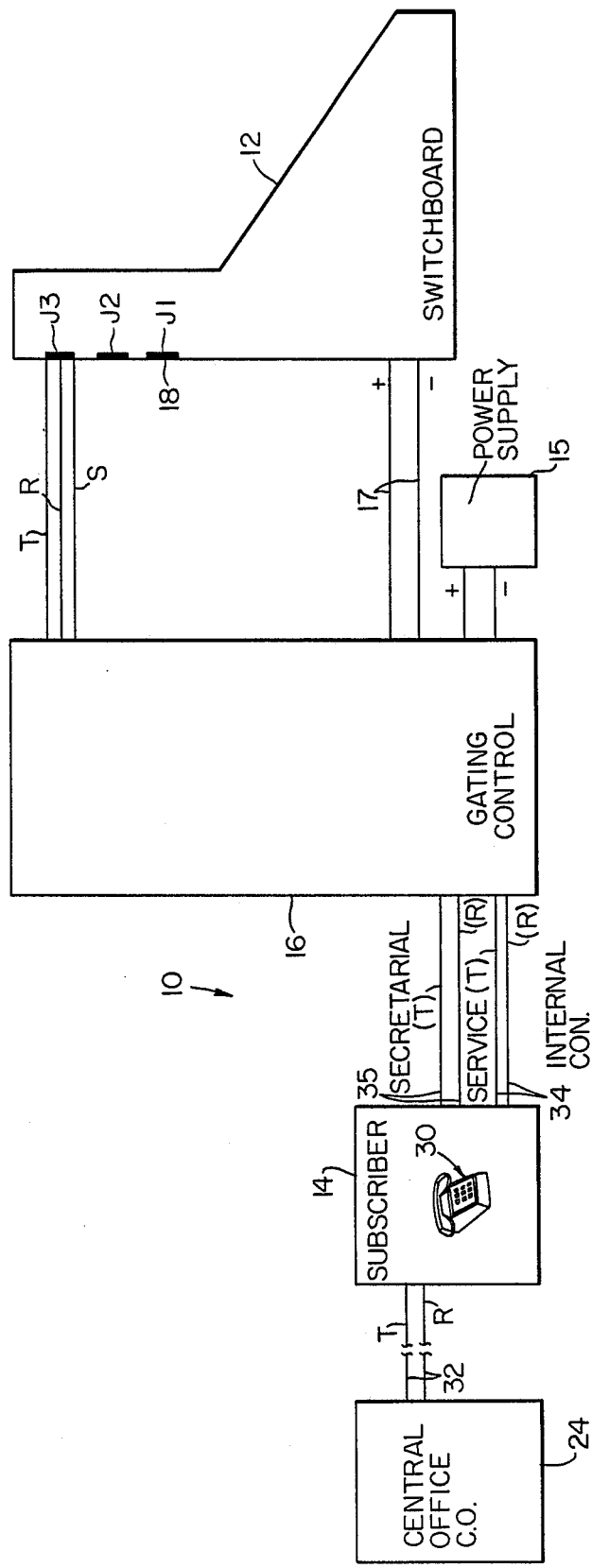
FIG. 1 is a block diagram of a manual telephone switchboard incorporating the electronic gating control of the present invention.

Referring to FIG. 1, there is illustrated in block diagram form an apartment manual switchboard system 10 constructed in accordance with the present invention for interconnecting a manual switchboard 12 to a subscriber unit or extension 14 through an electronic gating control 16. Switchboard 12, as is well known in the art, includes a plurality of jacks 18, only three of which are diagrammatically illustrated. In actual construction, switchboard 12 may include hundreds of such jacks. Each jack 18 is adapted to receive a plug 20 for establishing a closed loop with the central office 24 through tip and ring wires T and P, respectively, and connecting the sleeve wire S to a ground return in the switchboard housing to establish a control for the gating circuit as will be hereinafter described.

Figure 2:
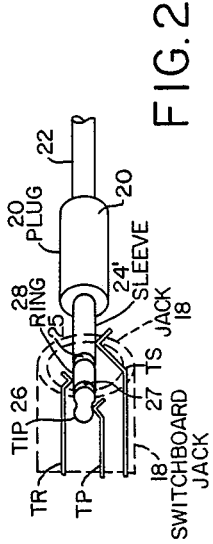
FIG. 2 is a fragmentary diagrammatic view of a typical plug and jack connection made at the switchboard illustrating the tip, ring and sleeve contact connections, the jack being shown in phantom.

A typical plug and jack connection is shown in FIG. 2. Plug 20 is connected at one free end of a flexible conductor 22 and adapted to be manually inserted by the switchboard attendant into an associated jack 18. Not shown, but associated with each jack is an indicator light adapted to be flashed when an incoming call is received and the system is in the secretarial answering mode or when the intercom mode is selected and the subscriber or extension desires to communicate with the attendant and takes the receiver off hook.

As shown in FIG. 2, the plug 20 terminates in a cylindrical sleeve 24', having a metallic tip 26 and an intermediate ring 28 separated from tip 26 by insulator 27 and from sleeve 24' by insulator 25. Within jack 18 are three spring contacts TT, TR and TS adapted upon insertion of plug 20 to make electrical contact with the tip 26, ring 28 and sleeve 24', respectively of the plug. In this manner, the local loop for each subscriber is completed in the secretarial mode.

A suitable power source 15 is provided for power connections for the gating control circuits as well as lamp and control voltages at the switchboard 12. Power line 17 provides power interconnection between the gating control 16 and switchboard.

Figure 3:
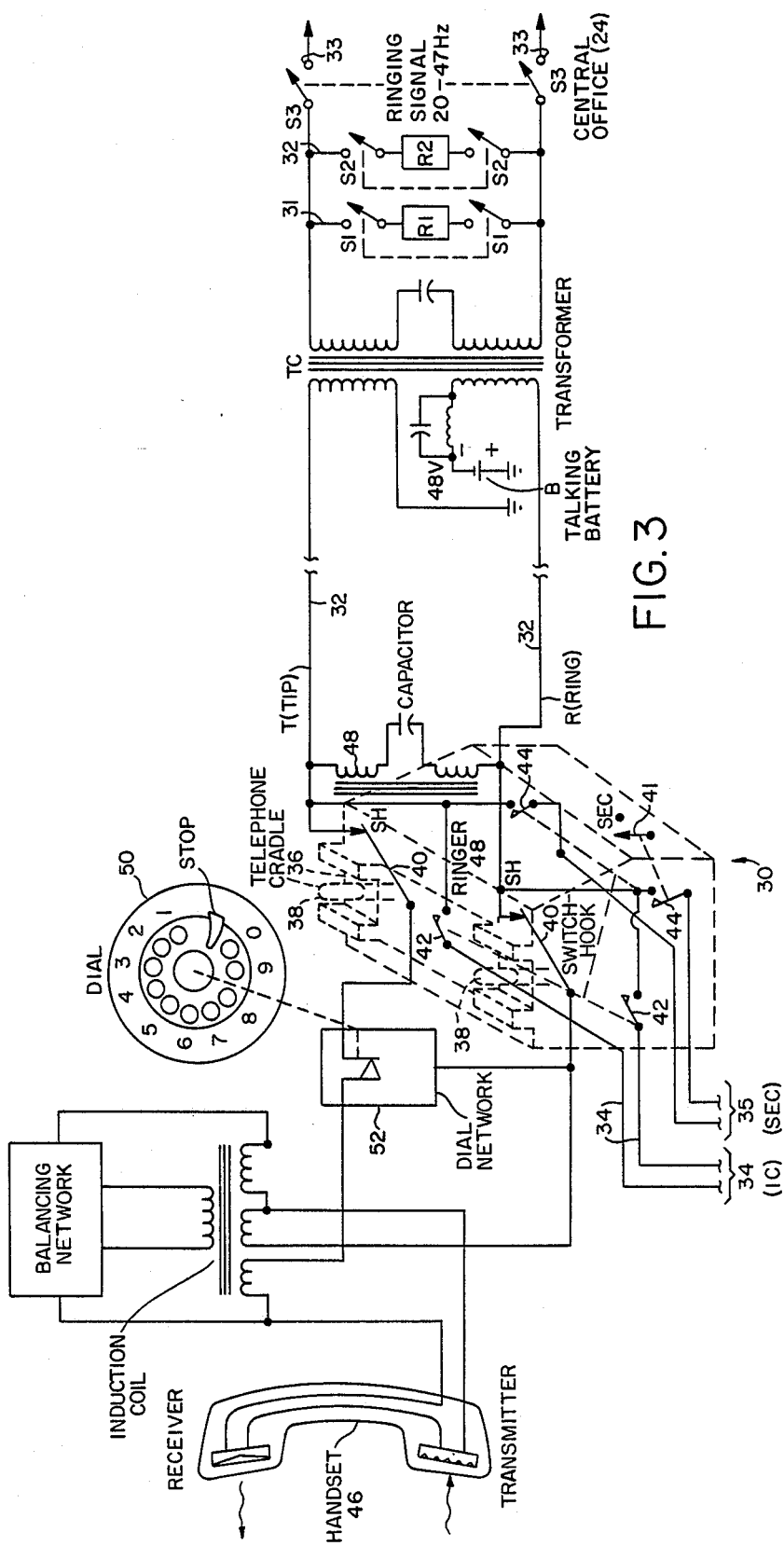
FIG. 3 is a schematic representation of a subscriber's local loop connection, the subscriber's telephone cradle being shown in phantom and connected to provide in house intercom and secretarial answering service in accordance with the present invention.

In the local loop, best shown in FIG. 3, each subscriber or extension 14 includes a telephone 30 connected to a central office 24 that contains switching equipment 31, 32, 33, signaling equipment TC and battery B that supply direct current to operate the telephone as shown in FIG. 1. Each phone 30 is connected to the central office through a local loop of two wires called a wire pair. One of the wires is called T (for tip) and the other is called R (for ring) which refers to the tip and ring parts 26 and 28, respectively, of the plug 20 used in manual switchboard 12. As is well known, switches in the central office 24 respond to the dial pulses or tones from the telephone to connect the calling phone to a called phone. When the connection is established, the two telephones communicate over transformer coupled loops using the current supplied by the central office battery B. To this end, telephone 30 includes a first wire pair 32 as shown in FIG. 1 for connection to the central office 24 without going through the gating control 16. A second wire pair 34 is connected through the gating control 16 to provide for intercom service through a three wire (T,R,S) plug/jack J3 on switchboard 12 and circuit selector means (relay contacts of relay K-1) within the gating control. A third wire pair 35 is connected to provide secretarial answering service in a manner to be hereinafter described.

Referring to FIG. 3, telephone 30 includes the usual cradle 36 and handset 46. Cradle 36 includes switchhook spring loaded buttons 38 arranged to mechanically contact a pair of switchhook elements 40 positioned within the cradle. Also positioned within the cradle and ganged to cooperate with operation of a control switch 41 are a pair of intercom switch elements 42 and a pair of secretarial service switch elements 44.

When a handset 46 of the telephone 30 is resting in its cradle 36, the weight of the handset holds the switchhook buttons 38 down and the switches 40 are open. This is the ON-hook condition. If control switch 41 is moved to the Secretarial (SEC) position, secretarial wire pair 35 are connected to the tip and ring wires through the normally open, but now closed contacts 44. When switch 41 is moved to the up position (OFF) as viewed in the drawings, switches 44 open to invalidate the SEC control. Contacts 42 are also ganged for operation with control switch 41 so that the intercom line can only be connected in the SEC mode. Preferably, the switch contacts 42 are connected on the ringer 48 side of the switchboard so that wire pair 34 is connected to the balancing network through switchhook 40 in the OFF hook position.

In the ON-hook position, the circuit between the telephone handset 46 and the central office is open; however, the ringer circuit in the telephone is always connected to the central office as shown in FIG. 3. The capacitor C, across the ringer 48, blocks the flow of dc from the battery B, but passes the ac ringing signal. The ringer circuit presents a high impedance to speech signals so it has no effect on them.

When the handset 46 is removed from its cradle 36, the spring-loaded buttons 38 come up and the contacts switchhook 40 close. This completes the circuit to the central office exchange and current flows in the circuit loop through the wire pair 32. This is the off-hook condition. The on-hook, off-hook, and hang-up terms come from the early days of telephony, when the receiver was separate and hung on the switchhook when not in use.

The off-hook signal tells the exchange that someone wants to make a call. The exchange returns a dial tone to the called phone to let the caller know that the exchange is ready to accept a telephone number.

Telephone 30 is illustrated with an exemplary dial 50 for dial pulsing. Rotary dial 50 opens and closes the local loop circuit at a timed rate by causing switch 52 to open and close. The number of dial pulses resulting from one operation of the dial is determined by how far the dial is rotated before releasing it. Of course, audio tones can be used to send the telephone number if the central office is equipped to process the tones. Instead of a rotary dial, a push-button keypad with 12 keys for the numbers 0 through 9 and the symbols * (asterisk) and # (octothorpe) may be used. Pressing one of the keys causes an electronic circuit in the keypad to generate two output tones that represent the number.

The central office has various switches S1, S2 and relays R1, R2, that automatically connect the calling and called phones through S3 when a ringing signal is received. If the called phone handset is off-hook when the connection is attempted, a busy tone generated by the central office is returned to the calling phone. Otherwise, a ringing signal is sent to the called phone to alert the called party that a call is waiting. At the same time, a ringback tone is returned to the calling phone to indicate that the called phone is ringing.

Operation of the telephone system is conventional and forms no part of the present invention.

Figure 4:
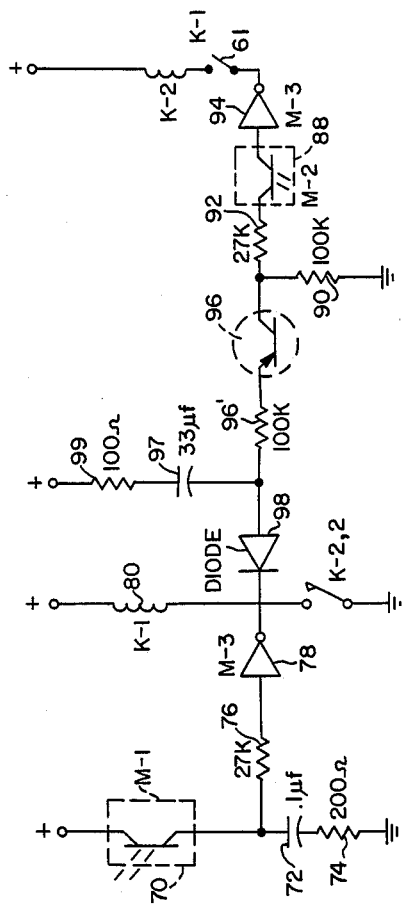
FIG. 4 is a schematic diagram of an electronic gating control in accordance with the present invention.
Figure 4:
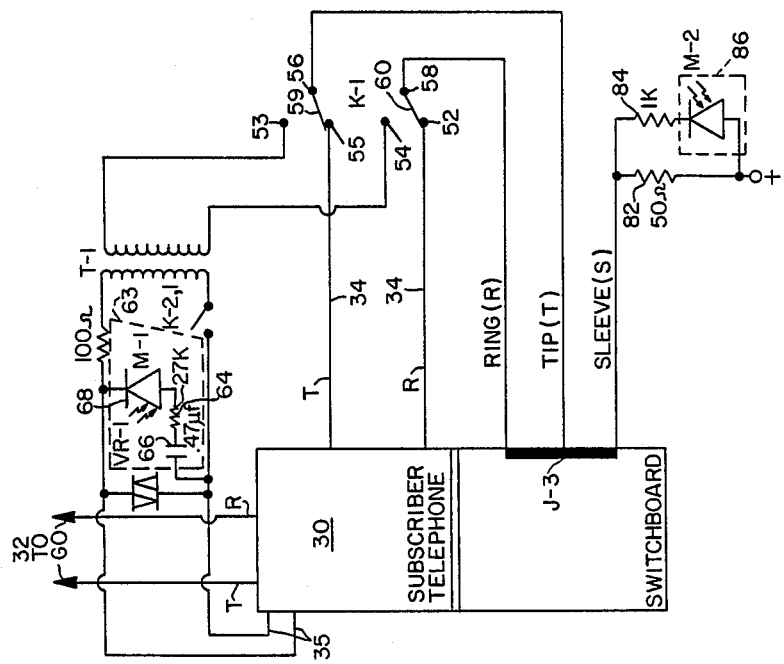

Referring now to FIG. 4, there is illustrated the schematic details of the present invention. In the internal or intercom mode, the gating circuit establishes an electrical path to complete the loop for the tip and ring wires of wire pair 34 through the normally closed fixed contacts 55, 56 and 57, 58 and their respective movable contact element 59 and 60 of relay K1. The tip (T) and ring (R) wires of the intercom circuit are, thus, connected to the tip (T) and ring (R) wires of the switchboard through jack J3. The tip and ring wires of the switchboard are connected to the tip and ring wires at J3 which are routed through relay K1 contacts to the extension telephone 30. With relay K1 in the non-energized position and the telephone OFF-hook, the voice signal is allowed to pass through the normally closed (NC) contacts of relay K1 and wire pair 34. Wire pair 34 has its tip and ring wires connected to the internal function of the apartment's secretarial telephone.

When a resident desires to reach the switchboard attendant via the internal or intercom mode, the resident sets the telephone mode switch 41 to the secretarial position SEC and goes off hook, i.e. lifts handset 46 off the cradle 36. Current flow is detected on the extension position at the switchboard. This lights an associated position lamp and buzzer to alert the attendant and the attendant plugs a cord into the associated jack to answer.

When the switchboard attendant desires to reach a resident, the attendant plugs a plug 20 into the resident's associated jack 18 and rings the bell which is associated with the internal tip and ring. The resident to answer goes off hook.

The gating control circuit remains in its non-energized state until the resident places the mode selector switch 62 in the secretarial position SEC and ringing current is detected on wire pair 35. The ring signal is detected by a ring detection circuit 63 comprising a resistor 64, capacitor 66 and optical isolator 68 (M-1) connected in series across the tip (T) and ring (R) wires of pair 35. Varistor VR1 is also connected across the wire pair 35. Since relay K-2 is not energized at this point, its two pairs of contacts K2, 1 and K2, 2 are open and no current flows through transformer T-1. Upon excitation of light emitter portion 68 of M-1, the photo detector portion 70 is excited causing a current to flow. Photodetector portion 70 is connected between a positive voltage source and the series capacitor resistor combination comprising capacitor 72 and resistor 74. The junction of capacitor 72 and the detector 70 is connected via resistor 76 and amplifier transistor 78 which drives the coil 80 of relay K-1. Relay K-1 is, thus, activated or energized following the establishment of a ringing cycle on wire pair 35 with the mode switch in the secretarial position. With relay K-1 activated, contact elements 59 and 60 are switched to their energized position to close contacts 53, 56 and 54, 58, respectively. During the active ring cycle, the contacts 53, 56 and 54, 58 are connected through transformer T1 across the tip (T) and ring (R) leads of J-3. Current flows through the circuit causing the indicator of the associated extension to be energized at the rate of the ring and, alert the attendant. Contacts 61 of relay K-1 are also closed upon energization of relay K-1. Contacts 61 are normally open and prevent energization of K2 upon insertion of plug 20 into jack 18 in the intercom mode.

Upon noting the flashing extension designation lamp, the attendant places a plug in jack J-3. This establishes a power connection to sleeve control lead S to which is connected resistors 82, 84 and the light emitting portion 86 of optical isolator M-2. The detecting portion 88 of optical isolator M-2 is switched on and a current flows through resistors 90, 92, detector 88 and amplifier 94. Amplifier 94, like transistor amplifier 78, is a Darlington array, Sprague 2805-A and its output drives coil K-2. Energization of coil K-2 causes its contacts K-2, 1 and K-2, 2 to close. Closure of contacts K-2, 2 establishes a holding circuit for relay K-1 after the normal ringing cycle is complete. Closure of contacts K-2, 1 places the primary of transformer T-1 across the tip (T) and ring (R) wires of the incoming call received on wire pair 35. The secondary of T-1 is connected through the now closed contacts 53, 66 and 54, 58 of relay K1 to jack J-3 and associated plug to the attendant's receiver establishing a switchboard talk path and allowing the attendant to talk with the caller on the line established to the central office. When the call is complete, plug 20 is removed from jack J-3. This breaks the energizing circuit for relay K-2 by interrupting the sleeve lead connection. K-2 deenergizes and its contacts K-2, 1 and K-2, 2 return to the open position. This in turn interrupts the hold circuit for relay K-1. Deenergization of relay causes its switch contacts 59 and 60 to return to the normal deenergized position reestablishing the intercom mode of operation.

It should be noted that it is not possible for the attendant to complete a C.O. line call on an apartment line and, thus, defraud a subscriber, because until the ringing current is detected and K-1 energized, the gating circuit remains in the intercom mode of operation. In this mode, contacts 55, 56 and 57, 58 are closed, allowing no access to the apartment C.O. line. This operation is not under the control of the attendant.

Removal of plug 20 may not in all cases result in rapid deenergization of relays K1 and K2 probably due to slow decay of current. Thus, the SEC mode may remain energized for a short period after the plug is pulled and preclude establishment of the intercom mode. To minimize the problem, there is connected between the drive circuits for relay K-1 and the drive circuits for relay K-2 a compensating network comprising a 390L PNP transistor connected as a diode switch. The collector of transistor 96 is connected to the junction of resistors 90, 92. The emitter of transistor 96 is connected via current limiting resistor 96' to the junction of capacitor 97 and the anode of D.C. blocking diode 98. The cathode of diode 98 is returned to the junction of the output of amplifier 78 and lower end of relay K-1. Capacitor 97 is connected at its other end to resistor 99 which is returned to a positive voltage source.

There has been described a gating circuit designed to operate in conjunction with a manual cord switchboard to service two operational modes with a single plug/jack connection. While other arrangements may suggest themselves to those skilled in the art, it should be noted that the foregoing specification is not intended to be limiting in nature and resort should be made to the appended claims which define the full scope of the invention.

We claim:

1. A gating circuit for operation in conjunction with a manual cord telephone switchboard to service first and second operational modes of a subscriber telephone connected for telephone communication to a central office, said first mode being an internal intercom connection between the subscriber telephone and the switchboard, said second mode being a secretarial service connection allowing direct communication between the switchboard and the central office, said gating circuit comprising ring detection circuit means for detecting when said subscriber telephone has been rung from the central office, switch means adapted to be switched between a first position for connecting the subscriber telephone in the intercom mode and a second position for connecting the subscriber telephone in the secretarial service mode in response to the detection of a ring from the central office by said ring detection circuit, and means for establishing a closed loop for direct communication between the central office and the switchboard when the switch means is in the second position.

2. A gating circuit as set forth in claim 1 wherein said switch means comprises a first relay having a first and a second set of contact elements, each set of contact elements having a first normally closed pair of contacts and a second pair of normally open contacts, means for connecting said first relay for energization in response to the detection of a ring from the central office to switch the first and the second set of contact elements such that the normally open contacts are closed.

3. A gating circuit as set forth in claim 2 wherein said means for establishing a closed loop includes a jack on said switchboard having first and second terminals connected respectively to the first and second set of contact elements and a plug adapted to be inserted in said jack for connecting said first and second terminals to a tip and ring of said plug.

4. A gating circuit as set forth in claim 2 wherein said ring detection circuit includes a first control element energized in response to a detected ring from the central office and said means for connecting said first relay for energization is responsive to the output of said first control element.

5. A gating circuit as set forth in claim 4 wherein said first control element and said means for connecting said first relay is an optical isolator.

6. A gating circuit as set forth in claim 3 wherein said jack includes a third terminal having a second control means connected thereto, said plug including a sleeve adapted to be connected to said third terminal upon insertion of the plug into the jack.

7. A gating circuit as set forth in claim 6 wherein said second control element is an optical isolator.

8. A gating circuit as set forth in claim 7 including a second relay connected to be energized in response to excitation of the second control element.

9. A gating circuit as set forth in claim 8 wherein said second relay includes a first set of contacts adapted to be closed upon energization of the second relay to establish the closed loop to the central office.

10. A gating circuit as set forth in claim 8 wherein said second relay includes a second set of contacts adapted to be closed upon energization of the second relay to establish a holding circuit for said first relay to maintain said first relay energized after a ring cycle is complete and the plug remains inserted in the associated jack.

* * * * *